June 21, 1938. D. M. HELWIG Re. 20,771

GUNNER COMPARTMENT

Original Filed Oct. 15, 1932 2 Sheets-Sheet 1

INVENTOR.
DREW M. HELWIG

BY

ATTORNEY.

June 21, 1938. D. M. HELWIG Re. 20,771
GUNNER COMPARTMENT
Original Filed Oct. 15, 1932 2 Sheets-Sheet 2
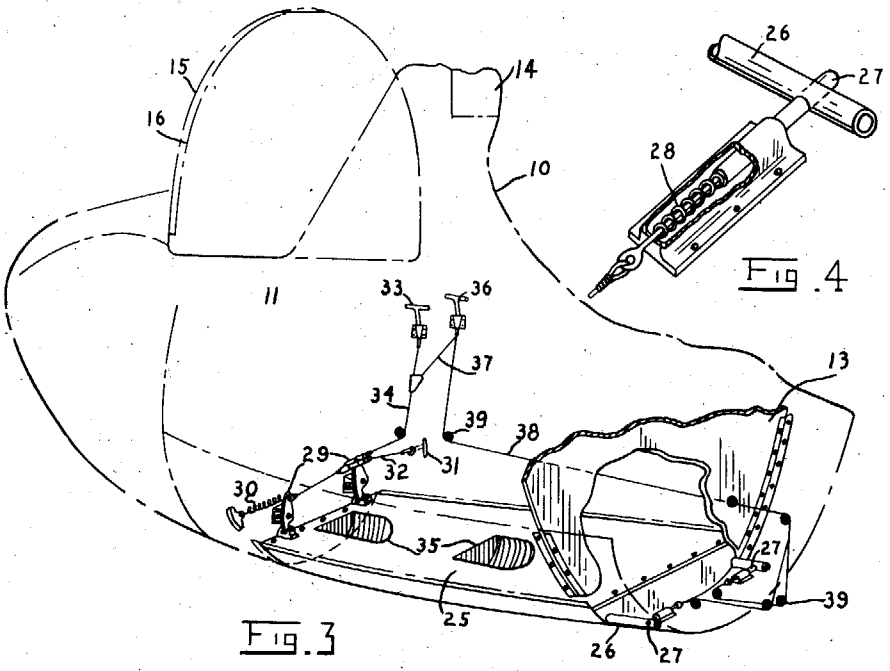
INVENTOR.
DREW M. HELWIG
BY
ATTORNEY.

Reissued June 21, 1938

Re. 20,771

UNITED STATES PATENT OFFICE 20,771

GUNNER COMPARTMENT

Drew M. Helwig, Raspeburg, Md., assignor to The Glenn L. Martin Company, Baltimore, Md.

Original No. 2,033,768, dated March 10, 1936, Serial No. 637,875, October 15, 1932. Application for reissue February 27, 1937, Serial No. 128,301

18 Claims. (Cl. 89—37.5)

This invention relates to a gunner compartment adapted to be carried by or constructed integral with a combat craft and more particularly for use with aircrafts of the combat type where gunner operations are required during high wind velocity; as for instance, an airplane in flight.

The effect of wind velocity or air pressure upon a gunner during operation seriously impairs the efficiency of his attack on a target. Gunner compartments have heretofore been provided for gunners, but they are inadequate to meet the severe conditions that are imposed upon gunners by air pressure or wind velocity.

It is one object of this invention to provide an improved gunner compartment.

Another object is to provide a gunner compartment that shall be so constructed as to prevent the passage of an air-blast therethrough.

Another object is to provide a gunner compartment having the above characteristics that shall provide ready and easy escape from such compartments when such escape is desired.

A further object is to provide a gunner compartment that shall have novel means for preventing an air-blast through such compartment as well as improved means for entering or escaping from such compartment.

A still further object is to provide in an aircraft or the like a novel arrangement of a pilot's compartment and a gunner compartment that shall include means for separating the two compartments while at all times maintaining visual contact between the gunner and the pilot.

The above and other objects will be made apparent throughout the further description of the invention when taken in connection with the accompanying drawings, wherein like reference characters refer to like parts. It is to be distinctly understood that the drawings are not a definition of the invention, but merely illustrate a preferred form by means of which the invention may be effectuated. The invention will be defined by the appended claims.

In the drawings:

Figure 3 is a diagrammatic fragmentary view having a portion broken away for the purpose of illustrating details of the operating mechanism, and Figure 4 is an enlarged detail view of one of the hinge pin mechanisms shown in Figure 3.

Figures 1, 2:
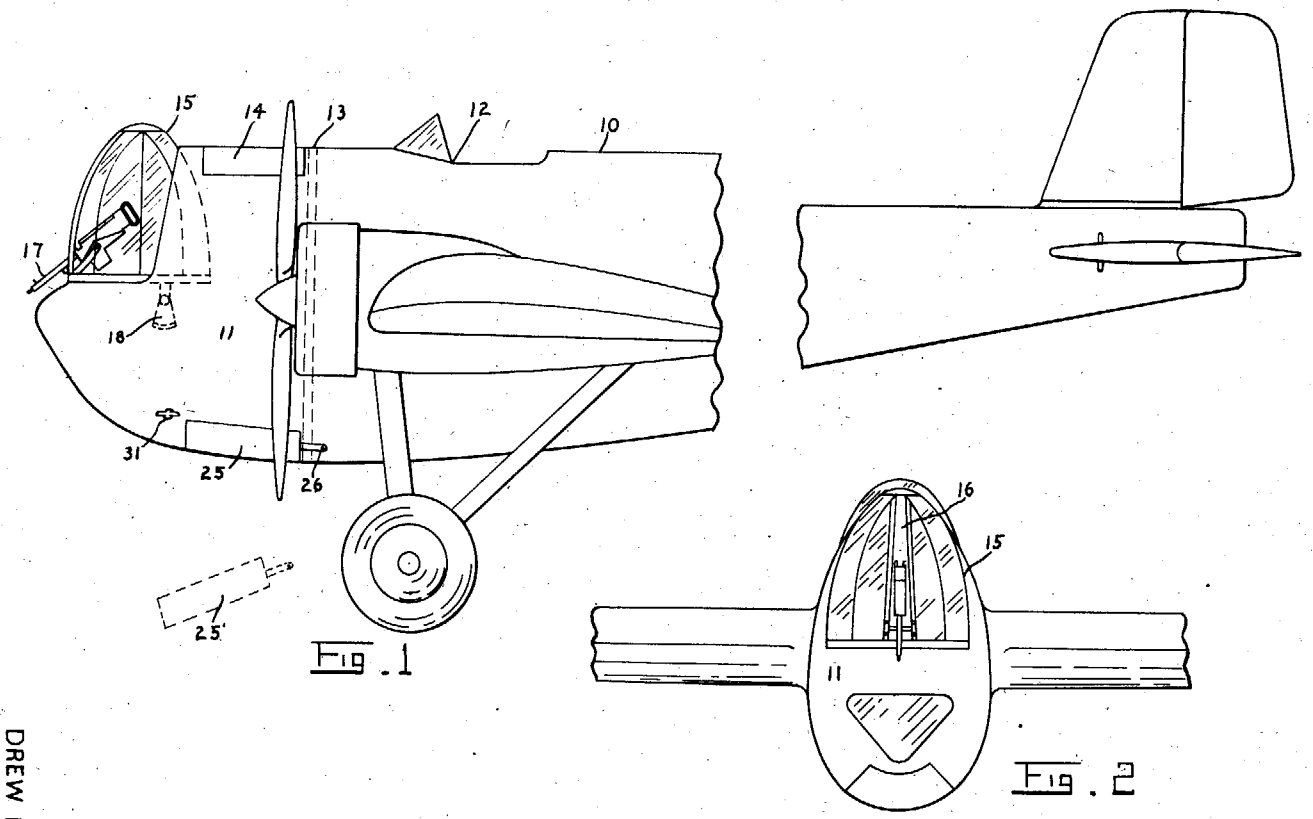
Figure 1 is a side elevation of an aircraft embodying the invention.
Figure 2 is a fragmentary front elevational view of Figure 1 embodying the invention.

The air speeds which are associated with combat airplane maneuvers are of such high magnitude that the resulting air-blast through a turret aperture into a conventional compartment will hamper the gunner in the performance of his duties, and also seriously impair his target hitting efficiency, unless an effective counter-acting pressure is provided.

The preferred embodiment of the invention here illustrated provides a gunner compartment in the front portion or nose of an aircraft, which location subjects it to an air pressure of probably as great a magnitude as any position in which a gunner compartment could be located. Especially is this true while flying at high speeds, diving, and aerial maneuvers during combat.

The present gunner compartments include a forwardly mounted gun turret having a transparent wall for general observation by the gunner as well as visual communication with the pilot, the wall being apertured in one side thereof only, through which the firing operations are executed. The compartment is otherwise substantially airtight.

The turret portion of the gunner compartment is mounted for turning movement about a vertical axis. The sides of the aperture are adapted to track a carriage upon which a gun may be swivel mounted so that it can be quickly and efficiently aimed and fired either downwardly or upwardly as well as laterally within the limitations of the aperture; and by revolving the turret more or less as required the field of fire can be effectively directed while maneuvering the airplane. A seat for the gunner is attached to the turret base so that he can maintain his position relative to the gun while revolving the turret. Airblast interference with the gunner, which has heretofore been associated with conventional arrangements of turrets and the like in high speed airplanes, is prevented by a counter-pressure that is automatically built-up as the direct result of airspeed reactions through the aperture into the otherwise substantially air tight compartment.

The turret apex projects somewhat above the upper surface of the fuselage in order to provide for gunner-pilot visual inter-communication, and also to eliminate the sense of personal isolation that would otherwise be engendered by the enclosed gunner compartment.

A forwardly latched and rearwardly hinged trap-door is provided in the bottom of the compartment for ingress and particularly for safe egress under emergency conditions. The latch is manually operable from either the inside or outside of the compartment, and the hinges are so constructed that the door can be completely detached from the fuselage structure. A release cable is connected to both latches and to the hinge pins so that the gunner can jettison the door in advance of leaving the compartment while flying to thereby insure himself against injury by an otherwise swinging door. The aforesaid air pressure within the compartment while flying, and particularly while diving at high speed materially assists in jettisoning the door.

The accompanying drawings depict a preferred form of the invention, but it is obvious that variations within the scope of the claims can be made by persons skilled in the related arts.

Referring to the drawings:

Fuselage 10 of a combat airplane is provided with a gunner's compartment 11, a pilot's position 12, and a substantially air tight bulkhead 13. An emergency exit is provided in the top of the compartment so that the gunner can escape in the event of a crash. The exit is normally closed by a substantially air tight door 14. A turret 15 having an aperture 16 is mounted upon the fuselage structure in communication with compartment 11. A gun 17 is suitably mounted upon the turret for convenient operation by the gunner. A seat 18 for the gunner is attached at the base of the turret.

A substantially air tight trap-door 25 is hinged to the fuselage structure at the bottom of the compartment by a pair of arms 26 and a pair of retractable hinge pins 27. The pins are urged by spring 28 into engagement with the arms. Latches 29 are urged by spring 30 to a position for latching the door in closed relation to the compartment. A handle 31 is connected by cable 32 to the latches so that the door can be opened from outside the compartment, and a handle 33 is connected by cable 34 to the latches so that the door can be opened from inside the compartment. The door is preferably provided with toeholds 35 to facilitate entering the compartment from the ground when the door is opened. A handle 36 is connected by cable 37 to cable 34, and also by cable 38 to pins 27; so that the latches and the hinge pins can be simultaneously released to completely detach the door from the fuselage structure. Pulleys 39 are provided for the cables where required. The door having been jettisoned; an exit is provided that is free from obstruction; particularly while diving in a more or less vertical direction.

The turret 15 is turnably mounted about its vertical axis in any suitable manner that will render it easily operable by the gunner. The seat 18 which is fixed to and carried by the turret 15 is hingedly mounted as shown in order that the pilot may stand erect or remain seated during firing operations. The seat 18 is particularly adapted for use by the pilot in turning the turret about its vertical axis, the seat being more or less in gripping contact with the pilot's body whereby the pilot may use both the seat 18 as well as the gun for manipulating the turret.

One of the important features of the present invention is in the provision of a gunner compartment as such. That is to say, the gunner compartment is a compartment separate from the other portions of the aircraft. In constructing an aircraft in such a manner as to define the gunner compartment distinct and separate from the other portions of the aircraft makes it possible to provide means whereby the gunner can operate from within the gunner compartment in such a manner as to prevent an air-blast through the gunner compartment.

A preferred embodiment for the means of preventing an air-blast through the gunner compartment is here illustrated as a single opening in one side of a turret portion, while the compartment as a whole is otherwise substantially closed to the ingress or egress of air. It is expressly emphasized that other means may be provided for preventing an air-blast through a gunner compartment and the single construction here illustrated and described, while the preferred embodiment, is utilized primarily to teach the improvement in constructing a gunner compartment so that an air-blast therethrough is precluded.

It is expected that one skilled in the art will now be able to make certain changes, substitutions, modifications, additions, and omissions in the single embodiment here illustrated and described without departing from the spirit and scope of the appended claims.

I claim:

1. In an airplane having a fuselage; a gunner compartment in the nose of said fuselage, having a turret portion the said portion being apertured into the positive pressure area; and means including a partition between the said compartment and the remainder of the fuselage whereby the compartment is substantially air tight except for said aperture.

2. An airplane as defined in claim 1 in which said means includes a door for ingress and egress.

3. An airplane as defined in claim 1 in which said means includes a rearwardly hinged and forwardly latched door for ingress and egress, and means operable by the gunner to operate the latch.

4. An airplane as defined in claim 1 in which said means includes a latched and hinged door for ingress and egress, the hinge being separable, and means operable by the gunner to operate the latch and separate the hinge to completely detach the door.

5. In an airplane having a fuselage; a gunner compartment in the nose of said airplane, the compartment including a streamlined gun turret, the wall of which is faired to the fuselage as well as apertured into the positive pressure area; and means including a partition between the said compartment and the remainder of the fuselage whereby the compartment is substantially air tight except for said aperture.

6. An airplane as defined in claim 5 in which said means includes a door for ingress and egress.

7. In an airplane having a pilot position; a gunner compartment in the nose of said airplane having a turret portion, the said portion being apertured into the positive pressure area; and means including a partition between the said compartment and the said position whereby the compartment is substantially air tight except for said aperture.

8. An airplane as defined in claim 7 in which the said means includes a door for ingress and egress by the gunner.

9. An airplane as defined in claim 7 in which the said means includes a transparent wall for visual communication between the gunner and the pilot and also a door for ingress and egress by the gunner.

10. In an airplane having a pilot position; a gunner compartment including a gun turret in the nose of said airplane, the turret being apertured into and revolvable within the positive pressure area; and means including a partition between the said compartment and the said position whereby the compartment is substantially air tight except for said aperture, the means also including a transparent wall for visual communication between the gunner and the pilot.

11. In an airplane having a pilot position; a gunner compartment in the nose of said airplane, the compartment including a gun turret having a transparent wall which is apertured into the positive pressure area, the wall providing for general observation and visual communication with the pilot; and means including a partition between the said compartment and the said position whereby the compartment is substantially air tight except for said aperture.

12. In an aircraft, a gunner compartment, the said compartment being fixed rigidly with the said aircraft and within the streamline surface thereof, and a turret carried by said compartment and faired into the same, said turret having an opening in one side thereof only whereby air is permitted to enter or leave the turret from one side only of a plane passing through one end of the opening and generally parallel to the direction in which the turret protrudes from the compartment, said compartment being otherwise substantially closed to the ingress and egress of air whereby a blast of air through the compartment is prevented.

13. In an aircraft, a gunner compartment, the said compartment being fixed rigidly with the said aircraft and within the streamline surface thereof, and a turrent carried by said compartment and faired into the same, said turret having an opening so positioned that air is permitted to enter or leave the turret from one side only of a plane passing through one end of the opening and generally parallel to the direction in which the turret protrudes from the compartment, said compartment being otherwise substantially closed to the ingress and egress of air whereby a blast of air through the compartment is prevented.

14. In an aircraft, a gunner compartment, the said compartment being fixed rigidly with the said aircraft and within the streamline surface thereof, and a turret carried by said compartment and faired into the same, said turret being rotatable and having an opening in one side thereof only whereby air is permitted to enter or leave the turret from one side only of a plane generally parallel to the axis of rotation of the turret, whereby when said compartment is otherwise substantially closed to the ingress and egress of air a blast of air through the compartment is prevented.

15. In an aircraft, a gunner compartment, the said compartment being fixed rigidly with the said aircraft and within the streamline surface thereof, and a turret carried by said compartment and faired into the same, said turret being apertured on one side thereof only into a positive pressure area, and means including a partition separating said compartment from the remainder of the airplane whereby said compartment is substantially airtight except for said aperture.

16. In an aircraft, a gunner compartment, the said compartment being fixed rigidly with the said aircraft and within the streamline surface thereof, and a turret carried by said compartment and faired into the same, said gunner's compartment being located on a leading portion of the airplane, said turret being apertured into a positive pressure area, and means including a partition separating said compartment from the remainder of the airplane whereby said compartment is substantially airtight except for said aperture.

17. In an aircraft, a gunner compartment, the said compartment being fixed rigidly with the said aircraft and within the streamline surface thereof, and a turret carried by said compartment and faired into the same, said gunner compartment being located in a leading portion of said aircraft, a partition separating said compartment from the other portions of the said aircraft, a revolvable turret carried by the said compartment, the said turret having an opening restricted to one side thereof facing into a positive pressure area, the said compartment being substantially closed to the ingress or egress of air except for the said opening in the said turret.

18. An aircraft including a gunner compartment fixedly located within a leading portion of the streamline surface thereof, means including at least one partition for separating the said compartment from the remaining portions of the said aircraft, a turret carried by said compartment and turnable relative thereto, and means including an aperture restricted to one side of said turret opening into a positive pressure area for operating firearms from within said compartment whereby air-blast through the said compartment is prevented.

DREW M. HELWIG.